United States Patent
Jiang et al.

(10) Patent No.: US 10,627,950 B2
(45) Date of Patent: Apr. 21, 2020

(54) TOUCH CONTROL PANEL, TERMINAL DEVICE AND METHOD FOR DETECTING TOUCH POINT

(71) Applicant: SHENZHEN GOODIX TECHNOLOGY CO., LTD., Shenzhen (CN)

(72) Inventors: Hong Jiang, Shenzhen (CN); Wu Liu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 53 days.

(21) Appl. No.: 15/927,062

(22) Filed: Mar. 20, 2018

(65) Prior Publication Data

US 2018/0210606 A1 Jul. 26, 2018

Related U.S. Application Data

(63) Continuation of application No. PCT/CN2016/108549, filed on Dec. 5, 2016.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04107* (2013.01); *G09G 2310/0264* (2013.01)

(58) Field of Classification Search
CPC .......... G06F 3/041; G06F 3/045; G06F 3/042; G06F 3/043; G01R 27/26
See application file for complete search history.

(56) References Cited

U.S. PATENT DOCUMENTS 8,952,913 B2  2/2015 Lee et al.
2014/0111446 A1*  4/2014 Lee ........................ G06F 3/0416
345/173

(Continued)

FOREIGN PATENT DOCUMENTS

CN       103049158       4/2013
CN       103777827 A     5/2014

(Continued)

OTHER PUBLICATIONS

"Clamper (electronics)" (Anonymous Author, Retrieved from the Internet: URL: https://en.wikipedia.org/w/index.php?title=Clamper (electronics)&oldid=752849232 [retrieved on Oct. 18, 2018]).

(Continued)

*Primary Examiner* — Pegeman Karimi

(57) ABSTRACT

A touch control panel (200), which could solve a problem of a reduction in touch control sensitivity caused by a floating state, includes: a driving module (210), a touch control chip (220), a plurality of driving channels (230) and a plurality of sensing channels (240), where the driving module (210) is connected to the touch control chip (220), the plurality of driving channels (230) and the plurality of sensing channels (240) are connected to the touch control chip (220), respectively, and the touch control chip (220) is configured to receive a first driving signal and a second driving signal transmitted by the driving module; the plurality of sensing channels (240) are configured to collect a sensing signal, and the touch control chip (220) is configured to determine coordinate information of a touch point on the touch control panel according to the sensing signal.

18 Claims, 8 Drawing Sheets

(56) References Cited

U.S. PATENT DOCUMENTS

| | | | |
|---|---|---|---|
| 2016/0041438 A1* | 2/2016 | Hu | G09G 3/3648 |
| | | | 345/174 |
| 2016/0048232 A1* | 2/2016 | Liu | G06F 3/044 |
| | | | 345/174 |
| 2016/0195977 A1 | 7/2016 | Reynolds et al. | |

FOREIGN PATENT DOCUMENTS

| | | |
|---|---|---|
| CN | 105335009 A | 2/2016 |
| CN | 205334417 U | 6/2016 |
| EP | 3242246 A1 | 11/2017 |
| KR | 20150001487 A | 1/2015 |
| KR | 20150087758 A | 7/2015 |
| WO | 2016106943 A1 | 7/2016 |

OTHER PUBLICATIONS

International Search Report for International Application No. PCT/CN2016/108549, Applicant: Shenzhen Goodix Technology Co., Ltd., dated Aug. 2, 2017, 5 pages.

\* cited by examiner

600

| S610 | The touch control chip receives a first driving signal and a second driving signal transmitted by a driving module so as to drive a plurality of driving channels to operate by a voltage difference between the first driving signal and the second driving signal |

| S620 | The plurality of sensing channels collect a sensing signal, where the sensing signal is a coupling signal between the plurality of driving channels and the plurality of sensing channels, and the plurality of driving channels are driven by the voltage difference between the first driving signal and the second driving signal |

| S630 | The touch control chip determines coordinate information of a touch point on a touch control panel according to the sensing signal |

FIG. 8

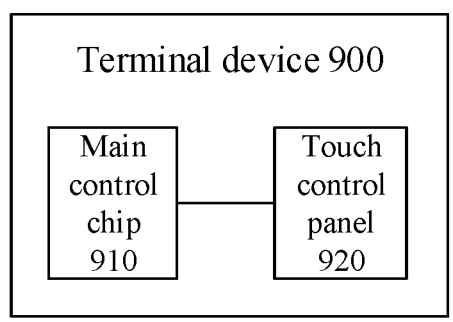

FIG. 9

TOUCH CONTROL PANEL, TERMINAL DEVICE AND METHOD FOR DETECTING TOUCH POINT

CROSS-REFERENCE TO RELATED APPLICATIONS

This application is a continuation of International Patent Application No. PCT/CN2016/108549, with an international filing date of Dec. 5, 2016, which is hereby incorporated by reference in its entireties.

TECHNICAL FIELD

Embodiments of the present application relate to the field of electronic products, and in particular, to a touch control panel, a terminal device and a method for detecting a touch point.

BACKGROUND

With the development of touch control technologies, there are more and more applications of an ultrathin screen in a terminal device. However, a touch screen (or a touch control screen or a touch control panel) may show different sensitivity when a terminal device is in different placement states. For example, touch control sensitivity may be low when a smart phone (namely, an example of the terminal device) is horizontally placed on a non-conductive desktop, because the touch screen is in a floating state, and a coupling capacitance between a person and the cell phone ground is small, resulting in that a sensing signal detected by the touch screen could not accurately reflect the coupling capacitance, thereby leading to a reduction in sensitivity of the touch screen.

Therefore, it is necessary to provide a technique that could solve a problem of a reduction of touch control sensitivity when a touch screen is in a floating state.

SUMMARY

Embodiments of the present application provide a touch control panel, a terminal device and a method for detecting a touch point, and floating ground of a touch control chip is implemented by a driving module, thus a problem of a reduction in touch control sensitivity caused by a floating state is solved.

According to a first aspect, the present application provides a touch control panel, including: a driving module, a touch control chip, a plurality of driving channels and a plurality of sensing channels, where the high-voltage driving module is connected to the touch control chip, and the plurality of driving channels and the plurality of sensing channels are connected to the touch control chip, respectively, where the touch control chip is configured to receive a first driving signal and a second driving signal transmitted by the driving module so as to drive the plurality of driving channels to operate by a voltage difference between the first driving signal and the second driving signal;

the plurality of sensing channels are configured to collect a sensing signal, the sensing signal is a coupling signal between the plurality of driving channels and the plurality of sensing channels, and the plurality of driving channels are driven by the voltage difference between the first driving signal and the second driving signal; and the touch control chip is configured to determine coordinate information of a touch point on the touch control panel according to the sensing signal.

Therefore, according to the embodiments of the present application, a first driving signal is transmitted to a touch control chip by a driving module such that one end of the touch control chip that is originally configured to connect the cell phone ground accesses the first driving signal, namely, the driving module instead of the cell phone ground becomes a ground reference point of the touch control chip, that is, the touch control chip serves an input end of the first driving signal as a reference ground, thereby implementing floating ground. The floating ground, namely, may be understood as a connection of the ground of the circuit and the cell phone ground without a conductor. However, for the touch control chip (or a driving channel), with the input end of the first driving signal as a reference, the cell phone ground that is originally without a fluctuating signal becomes a cell phone ground with a fluctuating signal, and a person is in a state of being connected to the cell phone ground, therefore, a sensing signal may be generated when the person touches a glass cover, a sensing channel feeds back the detected sensing signal to the touch control chip, and thus the touch control chip determines coordinate information of a touch point, namely, a position of the touch point. Therefore, a problem of a reduction in touch control sensitivity caused by a floating state is solved.

With reference to the first aspect, in a first possible implementation manner of the first aspect, the driving module is further configured to receive a synchronous input signal, and to process the synchronous input signal so as to obtain and output the first driving signal, where the synchronous input signal is a rectangular wave synchronized with the touch control chip.

Further, the touch control chip includes a synchronous output end, configured to input the synchronous input signal to a synchronous input end of the driving module.

Therefore, inputting a synchronous input signal to a driving module via a touch control chip ensures synchronization of the synchronous input signal and a driving signal and signal sampling of the touch control chip.

With reference to the first possible implementation manner of the first aspect, in a second possible implementation manner of the first aspect, the touch control chip includes a first power supply end and a first ground end, the driving module includes an operating voltage input end, the synchronous input end, a second power supply end and a second ground end, the synchronous input end is connected to the second ground end, the second ground end is connected to the first ground end, and the first power supply end is connected to the second power supply end, the driving module is particularly configured to receive the synchronous input signal via the synchronous input end, and to receive the second driving signal via the operating voltage input end; and the driving module is particularly configured to input the first driving signal to the first ground end via the second ground end, and to input the second driving signal to the first power supply end via the second power supply end, a capacitor is connected in parallel between the second power supply end and the second ground end, and the capacitor is configured to keep the voltage difference between the second driving signal and the first driving signal substantially constant.

With reference to the second possible implementation manner of the first aspect, in a third possible implementation manner of the first aspect, the driving module includes: a first inverter, a second inverter and a first diode, where the first inverter is connected to the second inverter in series, an input end of the first inverter is connected to the synchronous input end, an output end of the second inverter is connected to the second ground end, the operating voltage input end is connected to the second power supply end via the first diode so as to input the second driving signal to the second power supply end, and the operating voltage input end is connected to operating voltage ends of the first inverter and the second inverter.

With reference to the second possible implementation manner of the first aspect, in a fourth possible implementation manner of the first aspect, the driving module includes: a third inverter, a fourth inverter, a second diode, a boosting circuit and a level converting circuit, where the third inverter is connected to the fourth inverter in series, an input end of the third inverter is connected to the synchronous input end via the level converting circuit, an output end of the fourth inverter is connected to the second ground end, the operating voltage input end is connected to the second power supply end via the second diode so as to input the second driving signal to the second power supply end, and the operating voltage input end is connected to operating voltage ends of the third inverter and the fourth inverter via the boosting circuit.

With reference to the first aspect or the foregoing possible implementation manners thereof, in a fifth possible implementation manner of the first aspect, the touch control panel is disposed in a terminal device, the driving module is connected to a main control chip of the terminal device, and the main control chip is configured to input the second driving signal to the driving module.

With reference to the first aspect or the foregoing possible implementation manners thereof, in a sixth possible implementation manner of the first aspect, the touch control panel is disposed in the terminal device, the touch control chip is connected to the main control chip of the terminal device via a communication bus, and the touch control chip is further configured to transmit the coordinate information to the main control chip via the communication bus.

According to a second aspect, the present application provides a terminal device, including:
a main control chip; and
the touch control panel in the first aspect or any one of possible implementation manners of the first aspect,
where the main control chip is connected to the touch control chip.

Therefore, according to a terminal device of the embodiments of the present application, floating ground of a touch control chip is implemented by a driving module, thus a problem of a reduction in touch control sensitivity caused by a floating state is solved.

According to a third aspect, the present application provides a method for detecting a touch point, where the method is applied to a terminal device configured with a touch control panel, the touch control panel includes: a driving module, a touch control chip, a plurality of driving channels and a plurality of sensing channels, where the driving module is connected to the touch control chip, and the plurality of driving channels and the plurality of sensing channels are connected to the touch control chip, respectively, and the method includes:

receiving, by the touch control chip, a first driving signal and a second driving signal transmitted by the driving module, and driving the plurality of driving channels to operate according to a voltage difference between the first driving signal and the second driving signal;

collecting, by the plurality of sensing channels, a sensing signal, where the sensing signal is a coupling signal between the plurality of driving channels and the plurality of sensing channels, and the plurality of driving channels are driven by the voltage difference between the first driving signal and the second driving signal; and determining, by the touch control chip, coordinate information of a touch point on the touch control panel according to the sensing signal.

With reference to the third aspect, in a first possible implementation manner of the first aspect, before the receiving, by the touch control chip, the first driving signal transmitted by the driving module, the method further includes:

receiving, by the driving module, a synchronous input signal, where the synchronous input signal is a rectangular wave synchronized with the touch control chip; and processing, by the driving module, the synchronous input signal so as to obtain and output the first driving signal.

Therefore, according to a method for detecting a touch point of the embodiments of the present application, floating ground of a touch control chip is implemented by a driving module, thus a problem of a reduction in touch control sensitivity caused by a floating state is solved.

With reference to the first possible implementation manner of the third aspect, in a second possible implementation manner of the second aspect, the touch control chip includes a first power supply end and a first ground end, the driving module includes an operating voltage input end, a synchronous input end, a second power supply end and a second ground end, and the method further includes:
receiving, by the driving module, the synchronous input signal via the synchronous input end, and inputting the first driving signal to the first ground end via the second ground end; and receiving, by the driving module, the second driving signal via the operating voltage input end, and inputting the second driving signal to the first power supply end via the second power supply end.

With reference to the third aspect or the foregoing possible implementation manners thereof, in a third possible implementation manner of the third aspect, the terminal device further includes a main control chip, and the method further includes:
inputting, by the main control chip, the second driving signal to an operating voltage input end.

With reference to the third aspect or the foregoing possible implementation manners thereof, in a fourth possible implementation manner of the third aspect, the terminal device further includes the main control chip, and the method further includes:
transmitting, by the touch control chip, the coordinate information to the main control chip via a communication bus.

In some possible implementation manners, duration of a scan period is 10 milliseconds.

BRIEF DESCRIPTION OF DRAWINGS

FIG. 8 is a schematic flowchart diagram of a method for detecting a touch point according to an embodiment of the present disclosure.

FIG. 9 is a schematic block diagram of a terminal device according to an embodiment of the present disclosure.

DESCRIPTION OF EMBODIMENTS

A clear description of technical solutions of embodiments of the present application will be given below in combination with the accompanying drawings in the embodiments of the present application.

Figure 1:
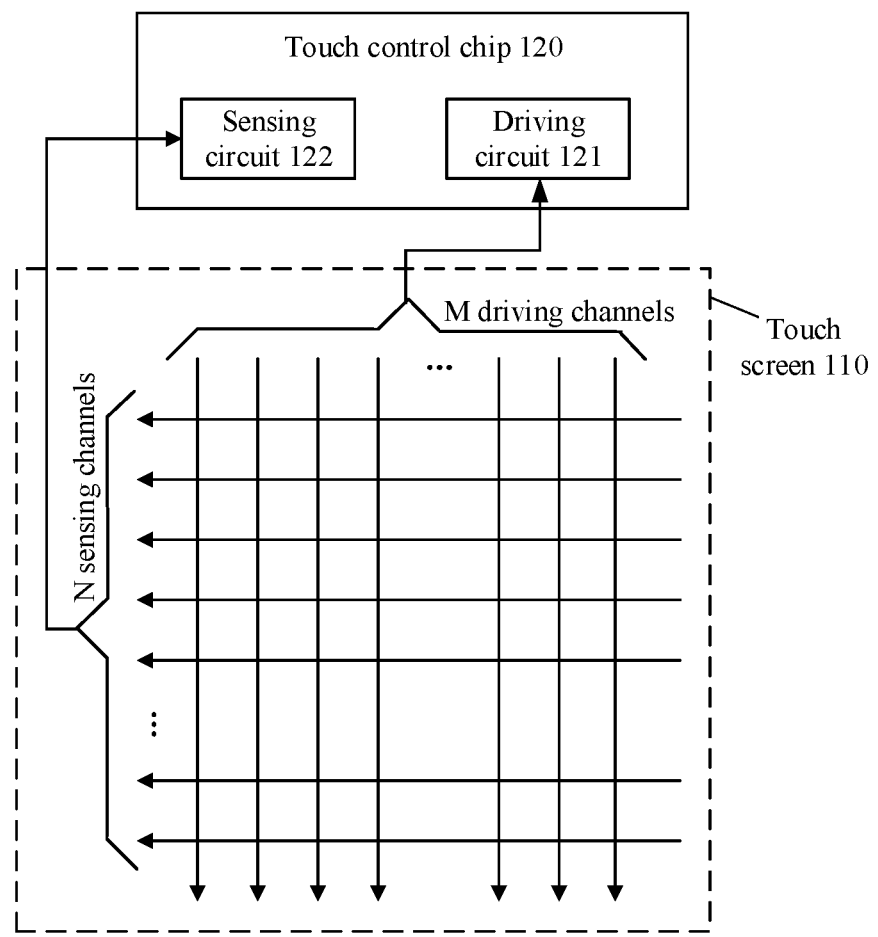
FIG. 1 is a schematic diagram of a system architecture of a touch control panel in the prior art.

To facilitate understanding, a method of detecting a touch point of a touch screen in the prior art is described firstly in combination with a system architecture of a touch control panel shown in FIG. 1. It should be understood that, a method of detecting a touch point of a touch screen according to the embodiments of the present application is not limited to the system architecture shown in FIG. 1, that is, except for detecting the touch point of the touch screen shown in FIG. 1, the method of detecting a touch point of a touch screen according to the embodiments of the present application may further be used for detecting a touch point of a touch screen with another structure.

FIG. 1 is a schematic diagram of a system architecture of a touch control panel in the prior art. As shown in FIG. 1, the system may include a touch screen (or a touch control panel) 110 and a touch control chip 120. The touch screen 110 may be a capacitive touch screen, and in particular, may be a projected mutual capacitance touch screen. The touch screen 110 includes a plurality of (for example, M, M being a natural number) driving channels and a plurality of (for example, N, N being a natural number) sensing channels. It should be understood that, values of M and N are not limited in the embodiments of the present, and M and N may be equal or unequal natural numbers.

The touch control chip 120 may also referred to as a touch controller or a touch detection module. The touch control chip 120 may be connected to the M driving channels and the N sensing channels, respectively. Particularly, the touch control chip may include a driving circuit (or referred to as a driving unit) 121 and a sensing circuit (or referred to as a sensing unit) 122, where the driving circuit 121 may be connected to the M driving channels of the touch screen 110, and the sensing circuit 122 may be connected to the N sensing channels of the touch screen 110.

The driving circuit 121 of the touch control chip 120 is configured to output a driving signal to the M driving channels of the touch screen 110, and the sensing circuit 122 of the touch control chip 120 is configured to receive or sense a sensing signal output by the N sensing channels of the touch screen.

The M driving channels of the touch screen 110 is configured to input the driving signal output by the driving circuit 121 of the touch control chip 120, and the N sensing channels of the touch screen 110 is configured to output the sensing signal to the sensing circuit 122 of the touch control chip 120 when the driving circuit 121 of the touch control chip 120 outputs the driving signal to some driving channel of the touch screen 110.

At present, the driving circuit 121 of the touch control chip 120 outputs the driving signal to at least one driving channel (for example, denoted as a driving channel #1) of the M driving channels of the touch screen 110 during a scan period when the touch control chip 120 detects a touch point on the touch screen 110, and the touch screen receives the driving signal via the driving channel #1. Since there is a coupling capacitance between a driving channel and a sensing channel on the touch screen, the sensing channel may sense a signal from the driving channel, that is, a coupling signal (or a sensing signal) of the driving signal may be generated on the sensing channel. Then, the N sensing channels of the touch screen 110 output the sensing signal on the sensing channels to the sensing circuit of the touch control chip 120 sequentially, and the sensing circuit of the touch control chip 120 receives the sensing signal output by each sensing channel. Finally, the touch control chip 120 may detect the touch point on the touch screen according to all sensing signals received from the N sensing channels of the touch screen 110 after the driving circuit 121 of the touch control chip 120 outputs driving signals respectively to the M driving channels of the touch screen 110, and calculate coordinate information of the touch point, or locate the touch point.

However, when the touch screen (or a terminal device configured with the touch screen) is in a floating state, the coupling capacitance detected by the sensing channels may not change or only change a little, so that the touch point could not be accurately located, resulting in a reduction in touch control sensitivity of the touch screen. This is because there is a small coupling capacitance between a person and the cell phone ground when the touch screen is in the floating state, that is, it could be understood that no loop could be formed among the person, the touch screen and the cell phone ground; in this way, current of the driving channels and the sensing channels could not be shunted well, and even coupling current between the driving channels and the sensing channels may increase, resulting in that the sensing signal received by the sensing channels could not accurately reflect an actual coupling capacitance.

It should be noted that, the cell phone ground may be understood as the ground of a cell phone in the embodiments of the present application, which is different from the ground of the earth (namely, the Earth).

In view of this, an embodiment of the present application provides a touch control panel, which enables a coupling capacitance value detected by sensing channels not to be affected by a floating state by using the floating ground technology, and an amount of change of a coupling capacitance caused by a touch to a touch screen could be truly reflected, so as to accurately determine coordinate information of a touch point.

A method of determining a touch point according to embodiments of the present application will be described below in detail with reference to FIG. 2 and FIG. 3.

Figure 2:
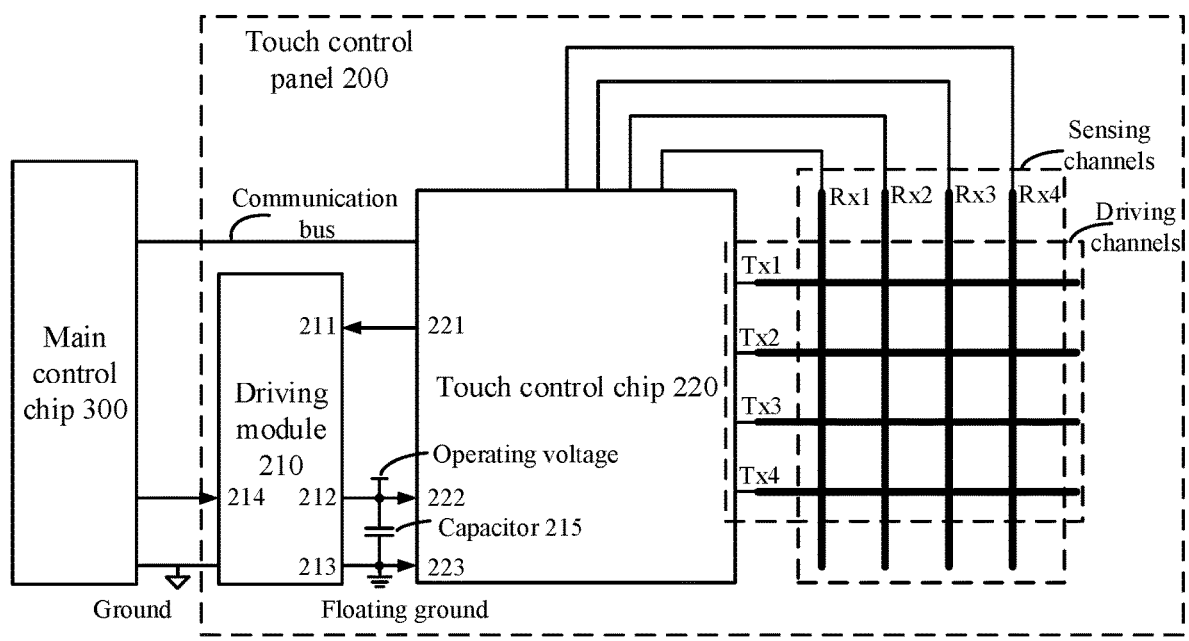
FIG. 2 is a schematic structural diagram of a touch control panel according to an embodiment of the present application.

FIG. 2 is a schematic structural diagram of a touch control panel 200 according to an embodiment of the present application. As shown in FIG. 2, the touch control panel 200 may be connected to a main control chip 300, and be disposed in a terminal device. The touch control panel 200 includes: a driving module 210, a touch control chip 220, a plurality of driving channels 230 and a plurality of sensing channels 240. The driving channels 230 and the sensing channels 240 are connected to the touch control chip 220, respectively. Particularly, the driving channels 230 and the sensing channels 240 are located below a glass cover. Moreover, the touch control chip 220 may include a driving circuit and a sensing circuit, which are connected to the driving channels 230 and the sensing channels 240, respectively. It should be understood that, although the glass cover, the driving circuit and the sensing circuit are not shown in FIG. 2, this should not set any limitation to the present application.

It should be noted that, the plurality of driving channels and the plurality of sensing channels shown in the drawing are perpendicularly intersected with each other and distributed below the glass cover, however, this is only an exemplary description; the driving channels may be understood as driving electrodes, distributed in the same plane (for example, denoted as a plane #1), the sensing channels may be understood as sensing electrodes, distributed in another plane (for example, denoted as a plane #2), and the two planes (i.e., the plane #1 and the plane #2) are stacked up and down and located below the glass cover. The stacking of the two planes may enable the driving channels to be distributed perpendicularly to the sensing channels, and there is a mutual capacitance at an intersection point of each driving channel and each sensing channel. It should be understood that, the distribution of the driving channels and the sensing channels in perpendicular to each other is only a possible implementation manner for detecting a coupling capacitance of a touch screen, and it does not set any limitation to the present application. As long as there is an intersection point that may generate a mutual capacitance between each driving channel and each sensing channel, and intersection points of the plurality of driving channels and the plurality of sensing channels may be evenly distributed below the entire touch screen, all of them should fall into the protection scope of the present application. In the embodiment of the present application, for the convenience of description, the intersection points of the driving channels and the sensing channels may be denoted as sensing points.

In the embodiment of the present application, the driving module may output a first driving signal and a second driving signal to the touch control chip, where a voltage difference between the first driving signal and the second driving signal is constant substantially, namely, an operating voltage of the plurality of driving channels. The voltage difference between the first driving signal and the second driving signal is used to drive the plurality of driving channels, such that the plurality of sensing channels may collect a sensing signal. The touch control chip then determines coordinate information of the touch point on the touch control panel according to the sensing signal.

It should be noted here that, the voltage difference between the second driving signal and the first driving signal may be used to drive the plurality of driving channels. Particularly, the voltage difference may be used to drive each of the plurality of driving channels sequentially; or, at least one of the plurality of driving channels may be driven at a time, and each of the plurality of driving channels may be driven at a time during a scan period; or, it is also possible to drive the plurality of driving channels at a time. That is, a driving voltage needs to traverse the plurality of driving channels during each scan period. Then, a coupling signal (or the sensing signal) between the plurality of driving channels and the plurality of sensing channels is collected via the plurality of sensing channels so as to locate the touch point on the touch control panel, where the plurality of driving channels are driven by the voltage difference.

It should be noted that, the voltage difference between the second driving signal and the first driving signal is constant substantially; that may be understood as that it varies within an acceptable range; that is, the voltage difference that varies within the acceptable range may not have a substantial effect or may be ignored when it is used to drive the foregoing driving channels to operate. It should be understood that, specific operating principles and operating processes of the driving channels and the sensing channels are described in detail in the foregoing description with reference to FIG. 1, and for concision, they will not be repeated redundantly herein.

Optionally, the driving module may receive a synchronous input signal synchronized with the touch control chip firstly, and process the synchronous input signal so as to obtain the first driving signal.

For example, the synchronous input signal may be input from the touch control chip to the driving module, and may also be input from other module (for example, other module in the terminal device configured with the touch control panel) to the driving module. It is necessary to ensure that the synchronous input signal is synchronized with the touch control chip no matter the synchronous input signal is input from which module. Particularly, the synchronous input signal is synchronized with an output of the driving circuit that is used to drive the plurality of driving channels to operate in the touch control chip.

In the embodiment of the present application, the synchronous input signal may be a rectangular wave. Typically, the synchronous input signal is a square wave, which is a rectangular wave with 50% duty cycle.

The driving circuit inputs the operating voltage (or the driving voltage) to the plurality of driving channels so as to obtain the sensing signal (or the coupling signal) of the intersection point between each driving channel and each sensing channel via the sensing channels, and thus the coordination information of the touch point is determined (the process will be described in detail hereinafter with reference to FIG. 3).

Therefore, according to the embodiment of the present application, a first driving signal is transmitted to a touch control chip by a driving module such that one end of the touch control chip that is originally configured to connect the cell phone ground accesses the first driving signal, namely, the driving module instead of the cell phone ground becomes a ground reference point of the touch control chip, that is, the touch control chip serves an input end of the first driving signal as a reference ground, thereby implementing floating ground. The floating ground, namely, may be understood as a connection of the ground of the circuit to the cell phone ground without a conductor. However, for the touch control chip (or a driving channel), with the input end of the first driving signal as a reference, the cell phone ground that originally has no fluctuating signal has a fluctuating signal, and a person is in a state of being connected to the cell phone ground, therefore, a sensing signal may be generated when the person touches a glass cover, a sensing channel feeds back the detected sensing signal to the touch control chip, and thus the touch control chip determines coordinate information of a touch point.

Therefore, the touch control panel enables the touch control chip to implement the floating ground by inputting a synchronous input signal to a ground end of a driving module and connecting to the ground of the touch control chip. Moreover, a voltage across a power supply end and the ground end of the touch control chip is kept at an operating voltage of the driving channels by connecting a capacitor between the power supply end and the ground end of the touch control chip, thus the touch control chip may not sense a change of a signal with respect to the cell phone ground, and the floating ground technology is implemented.

Optionally, as shown in FIG. 2, the touch control chip 220 may further includes: a synchronous output end 221, a first power supply end 222 and a first ground end 223; and the driving module 210 may further includes: a synchronous input end 221, a second power supply end 212, a second ground end 213 and an operating voltage input end 214.

The touch control chip 220 transmits the synchronous input signal to the synchronous input end 211 of the driving module 210 via the synchronous output end 221, and the driving module 210 obtains the first driving signal by processing the synchronous input signal. Moreover, the driving module receives the second driving signal via the operating voltage input end. The synchronous input end 211 is connected to the second ground end 213, the second ground end 213 is connected to the first ground end 223, the first power supply end 222 is connected to the second power supply end 212, the second ground end 213 is configured to input the first driving signal to the first ground 223, and the second power supply end 212 is configured to input the second driving signal to the first power supply end 222. A capacitor 215 is connected in parallel between the second power supply end 212 and the second ground end 213, and the capacitor 215 is configured to keep the voltage difference between the second driving signal and the first driving signal, or is configured to buffer the change of the voltage difference.

It may be understood that, a voltage difference between the first power supply end and the second power supply end may be zero, and a voltage difference between the first ground end and the second ground end may be zero.

A specific process of obtaining a first driving signal by processing a synchronous input signal by the driving module will be described in detail below with reference to two circuit diagrams of functions for driving modules shown in FIG. 3 and FIG. 4. However, it should be understood that, FIG. 3 and FIG. 4 are only possible implementation manners for implementing the floating ground technology, they do not set any limitation to the present application, and the present application does not exclude the possibility of other circuits for implementing the floating ground technology.

Figure 3:
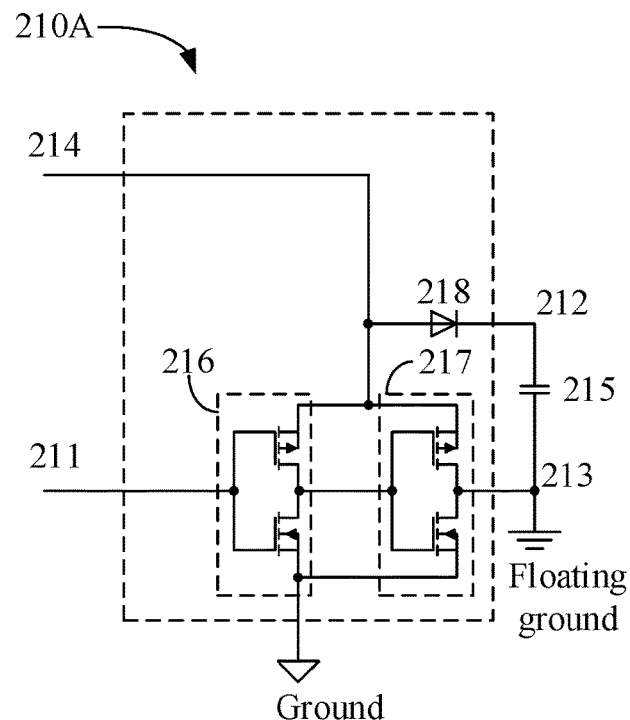
FIG. 3 is a schematic circuit diagram of a driving module according to an embodiment of the present application.
Figure 4:
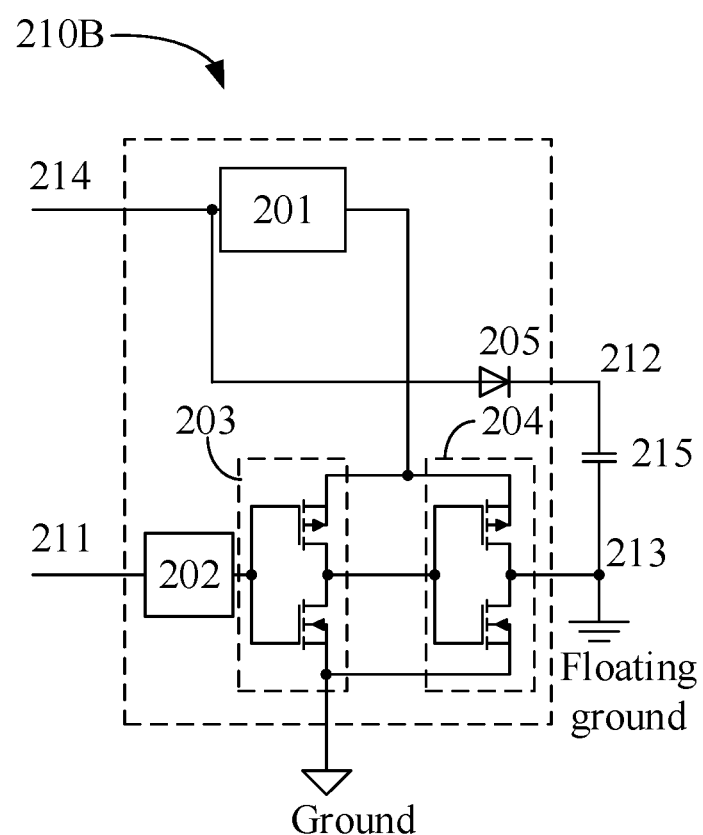
FIG. 4 is a schematic circuit diagram of a driving module according to another embodiment of the present application.

FIG. 3 is a schematic circuit diagram of a driving module 210A according to an embodiment of the present application. As shown in FIG. 3, the driving module 210A includes: a first inverter 216, a second inverter 217 and a first diode 218. The first inverter 216 is connected to the second inverter 217 in series, an input end of the first inverter 216 is connected to the synchronous input end 211, an output end of the second inverter 217 is connected to the second ground end 213, the operating voltage input end 214 is connected to the second power supply end 212 via the first diode 218, and the operating voltage input end 214 is connected to operating voltage ends of the first inverter 216 and the second inverter 217 so as to input an operating voltage (for example, 3.3V) to the first inverter 216 and the second inverter 217, where a positive pole of the first diode 218 is connected to the operating voltage input end 214, and a negative pole of the first diode 218 is connected to the second power supply end 212.

The synchronous input end 211 receives a synchronous input signal firstly during a scan period, and the synchronous input signal may be a rectangular wave, such as a square wave, which is a rectangular wave with 50% duty cycle. A low level of the square wave may be 0V, and a high level of that may be 3.3V. A waveform that alternates between the high level and the low level is obtained at the second ground end 213 after processing the synchronous input signal by the first inverter 216 and the second inverter 217, where the low level may be 0V, and the high level may be 3.3V.

On the other hand, the operating voltage input end 214 may be configured to receive a second driving signal. In the embodiment of the present application, the second driving signal may have a voltage of 3.3V. The second driving signal charges a capacitor 215 via the first diode 218, where the capacitor 215 is connected in parallel between the second power supply end 212 and the second ground end 213, such that a voltage difference between the second power supply end 212 and the second ground end 213 is a driving voltage for driving channels to operate.

Particularly, the operating voltage input end 214 charges the capacitor 215 via the first diode 218 when the synchronous input end 211 outputs the low level, such that a voltage of the second power supply end 212 reaches to 3.3V, and the second power supply end 212 supplies power to a touch control chip. In this case, the voltage difference between the second power supply end 212 and the second ground end 213 is 3.3V (it may be understood that, since the first diode 218 is connected between the second power supply end 212 and the operating voltage input end 214, considering a voltage drop of the first diode 218, an actual voltage drop of the second power supply end 212 may be slightly lower than 3.3V, that is, the actual voltage difference between the second power supply end 212 and the second ground end 213 may be slightly lower than 3.3V. However, it should be understood that, this is not the core of the present application, and for concision, descriptions of the same or similar situations will be omitted in the following).

When the synchronous input end 211 inputs the high level, an output of the second ground end 213 is 3.3V, and the operating voltage 214 stops charging the capacitor 215. Due to the characteristic that a voltage across two ends of a capacitor could not change suddenly, the voltage difference between the second power supply end 212 and the second ground end 213 is still kept at 3.3V for a short time, a voltage of the second power supply end 212 is raised to 6.6V, and the first diode 218 is turned off. In this case, the capacitor 215 discharges to the touch control chip, that is, operating current of the touch control chip is provided by the capacitor 215.

Therefore, for the touch control chip, the ground thereof is changed from the original cell phone ground to the second ground end 213, that is, for the touch control chip, it is believed that the second ground end 213 is constant, and as a reference, the cell phone ground has a changing signal. Accordingly, the floating ground is implemented, that is, the ground of the touch control chip is the ground with a fluctuating signal, the touch control chip takes the ground with the fluctuating signal as a reference, and thus the cell phone ground that is originally without a fluctuating signal becomes a cell phone ground with a fluctuating signal for the touch control chip. This fluctuating signal may directly coupled to the body of a person. Meanwhile, the signal may also be coupled to the ground (namely, the Earth), and then there is also a signal that is coupled to the body of the person through the ground, that is, the ground plays a role of indirect coupling.

It should be understood that, the square wave exemplified in the foregoing description is only an exemplary description, the rectangular wave may also be a pulse signal with different duty cycle, and the present application does not particularly limit hereto. As long as it could be ensured that a driving voltage is provided to a driving channel and sampling of a touch control signal is synchronized, and all of them should fall into the protection scope of the present application.

FIG. 4 is a schematic circuit diagram of a driving module 210B according to another embodiment of the present application. As shown in FIG. 4, the driving module 210B includes: a boosting circuit 201, a level converting circuit 202, a third inverter 203, a fourth inverter 204 and a second diode 205.

The third inverter 203 is connected to the fourth inverter 204 in series, an input end of the third inverter 203 is connected to the synchronous input end 211 via the level converting circuit 202, an output end of the fourth inverter 204 is connected to the second ground end 213, the operating voltage input end 214 is connected to the second power supply end 212 via the second diode 205, and the operating voltage input end 214 is connected to operating voltage ends of the third inverter 203 and the fourth inverter 204 so as to input an operating voltage to the third inverter 203 and the fourth inverter 204, where a positive pole of the second diode 205 is connected to the operating voltage input end 214, and a negative pole of the second diode 205 is connected to the second power supply end 212.

It should be understood that, an operating principle of the driving module 210B is similar to that of the driving module 210A, and for concision, detailed descriptions of similar parts are omitted herein. The driving module 210A and the driving module 210B may be called as a low-voltage driving module and a high-voltage driving module, respectively, according to the different input operating voltages. Particularly, the voltage input from the operating voltage input end in the high-voltage driving module is amplified to 15V in that the voltage is processed by the boosting circuit 201, that is, a second driving signal has a voltage of 15V. In order to balance the voltage of 3.3V input by a synchronous input end, the level converting circuit 202 is used, so that the voltage at the second ground 213 that is obtained by processing the voltage by the third inverter 203 and the fourth inverter 204 is 15V.

Therefore, when the synchronous input end is input a pulse square wave that alternates between a high level and a low level (for example, the low level may be 0V, and the high level may be 3.3V), the voltage measured at the second ground end 213 varies alternately within 0V-15V.

According to the principle the same as the principle of the low-voltage driving module, a voltage difference between the second power supply end 212 and the second ground end 213 is kept at 3.3V with the lifting effect of a capacitor 215, and the voltage of the second power supply end 212 varies alternately within 15-18.3V.

An operating voltage is provided to driving channels by a driving module that is provided between an existing touch control chip and an existing main control chip, the driving module replaces the cell phone ground of the touch control chip, and thus the floating ground of the touch control chip may be implemented.

It should be understood that, specific values of the high level and the low level and the operating voltage of the driving channels that are exemplified in the foregoing descriptions are only exemplary descriptions, and they should not set any limitation to the present application, and the present application is not limited hereto. For example, the synchronous input end 211 may be directly connected to the second ground end 213, that is, the driving module may serve the received synchronous input signal as a first driving signal directly. In this case, driving capability of the synchronous input signal should be strong enough.

It should also be understood that, the first inverter in the low-voltage driving module and the third inverter in the high-voltage driving module that are shown in the foregoing descriptions may be the same or different, the second inverter in the low-voltage driving module and the fourth inverter in the high-voltage driving module may be the same or different, the first diode in the low-voltage driving module and the second diode in the high-voltage driving module may be the same or different, and the present application does not particularly limit hereto. The first, the second, the third, and the fourth are used only to distinguish devices in different driving modules, and it should not set any limitation to the present application.

Optionally, as shown in FIG. 2, the touch control chip 220 includes the synchronous input end 221, configured to input the synchronous input signal to the synchronous input end 221 of the driving module 210, and to implement synchronization of the synchronous input signal and the touch control chip.

It should be noted here that, the synchronous input signal may be input from the touch control chip to the driving module, and in this case, the synchronous input signal may be synchronized with the touch control chip. On one hand, it is ensured that a stable driving voltage is provided to driving channels of the touch control chip, and on the other hand, it is ensured that sampling of a touch control signal is synchronized with a driving signal so as to ensure that correct data could be collected.

However, it should be understood that, this is only a possible implementation manner, the synchronous input signal may also be input from other modules, such as a main control chip to be described hereinafter, to the driving module. In this case, the synchronous input signal is also necessarily synchronized with the touch control chip, which requires synchronization of the main control chip with the touch control chip.

In the embodiment of the present application, the touch control panel 200 may be disposed in a terminal device. Referring to FIG. 2 again, optionally, the terminal device further includes a main control chip 100. The main control chip 100 is connected to the driving module 210 so as to input an operating voltage to the driving module 210 via the operating voltage input end 214.

Optionally, as shown in FIG. 2, the touch control chip 220 may be connected to the main control chip 100 via a communication bus to transmit locating coordinates of a touch point to the main control chip 100, so that the main control chip 100 performs corresponding processing according to the locating coordinates.

It should be noted that, only to facilitate understanding, the main control chip, the driving module and the touch control chip are shown in the drawings, and this does not set any limitation to the present application; and the terminal device may further includes other modules or unit except for the foregoing exemplified modules or units, which will not be enumerated here for concision.

It should be further noted that, only to facilitate understanding and illustrating, the main control chip, the driving module and the touch control chip are shown individually in the drawings, and this should not set any limitation to the present application, and the present application is also not limited hereto. For example, the driving module may be disposed in the main control chip, or may also be disposed in the touch control chip. The present application does not particularly limit the specific existing form of each module or unit, as long as the foregoing corresponding functions could be completed.

A specific process for locating a touch point according to a touch control panel of an embodiment of the present application will be described in detail below with reference to FIG. 5.

Figure 5:
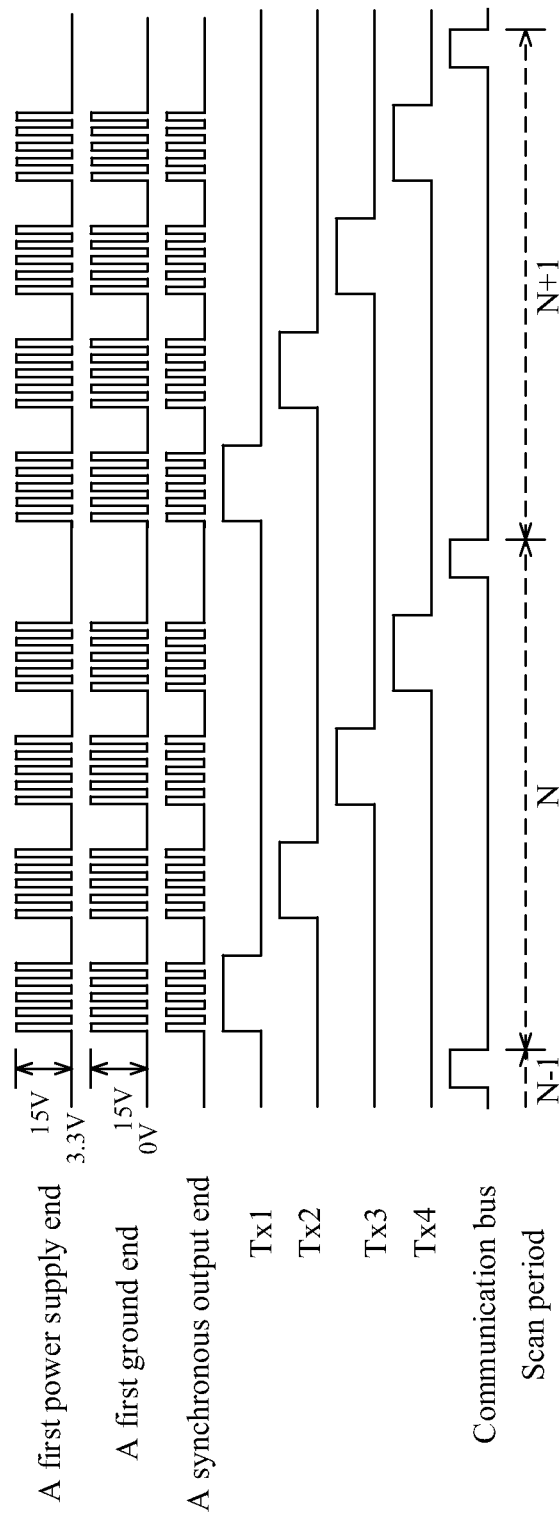
FIG. 5 is a timing diagram of a driving signal applied to a touch control panel of an embodiment of the present application for detecting a touch point.

FIG. 5 is a timing diagram of a driving signal for detecting a touch point, where the driving signal is applied to a touch control panel of an embodiment of the present application. As shown in FIG. 5, a synchronous output end firstly outputs a synchronous input signal to a synchronous input end during a scan period (such as an Nth period or an N+1th period shown in the drawing), the synchronous input signal is processed by a driving module to obtain a first driving signal, and a second ground end transmits the first driving signal to a first ground end, for example, the first driving signal may have a voltage of 15V. Assuming that a voltage difference between a second power supply end and the second ground end is 3.3V, a voltage of a first power supply end may be raised to 18.3V due to the effect of bootstrap lifting of a capacitor.

The synchronous input end continuously transmits the synchronous input signal many times during a scan period, such that sensing channels are input with a second driving signal, respectively, and a scan is completed. Optionally, the first power supply end may input the second driving signal to each of a plurality of sensing channels sequentially. As shown in FIG. 3, the second driving signal is input from Tx1 to Tx4 sequentially, and detection is performed on Rx1 to Rx4 when the second driving signal is input from Tx1 to Tx4 at each time, so as to collect an amount of change of a coupling capacitance of each intersection point of Tx1 to Tx4 and Rx1 to Rx4.

It should be noted here that, although Tx1 to Tx4 shown in the drawing receive the driving signal (corresponding to a rectangular wave in FIG. 5) respectively, in fact, an amplitude value of the rectangular wave could not be measured. Since the ground of a touch control chip is the floating ground, Tx1 to Tx4 are not fluctuant with reference to its own floating ground; and the rectangular wave shown in the drawing is only a sign of a received driving voltage (or a controlling signal), and it does not set any limitation to the present application.

It should be noted here that, duration of the scan period is very short usually. Typically, a scan period may be 10 milliseconds (ms) to ensure that the duration of the scan period is much shorter than the duration for which a touch screen is touched, that is, the duration for which the touch screen is clicked and touched is able to complete scanning of at least one scan period.

It should also be noted that, a method of inputting the second driving signal to Tx1 to Tx4 sequentially during a scan period that is shown in the drawing is only an exemplary description, and it should not set any limitation to the present application. The first power supply end may input the second driving signal to only one or more of the plurality of sensing channels at a time, as long as it is ensured that all sensing channels may be traversed during each scan period.

Figure 6A:
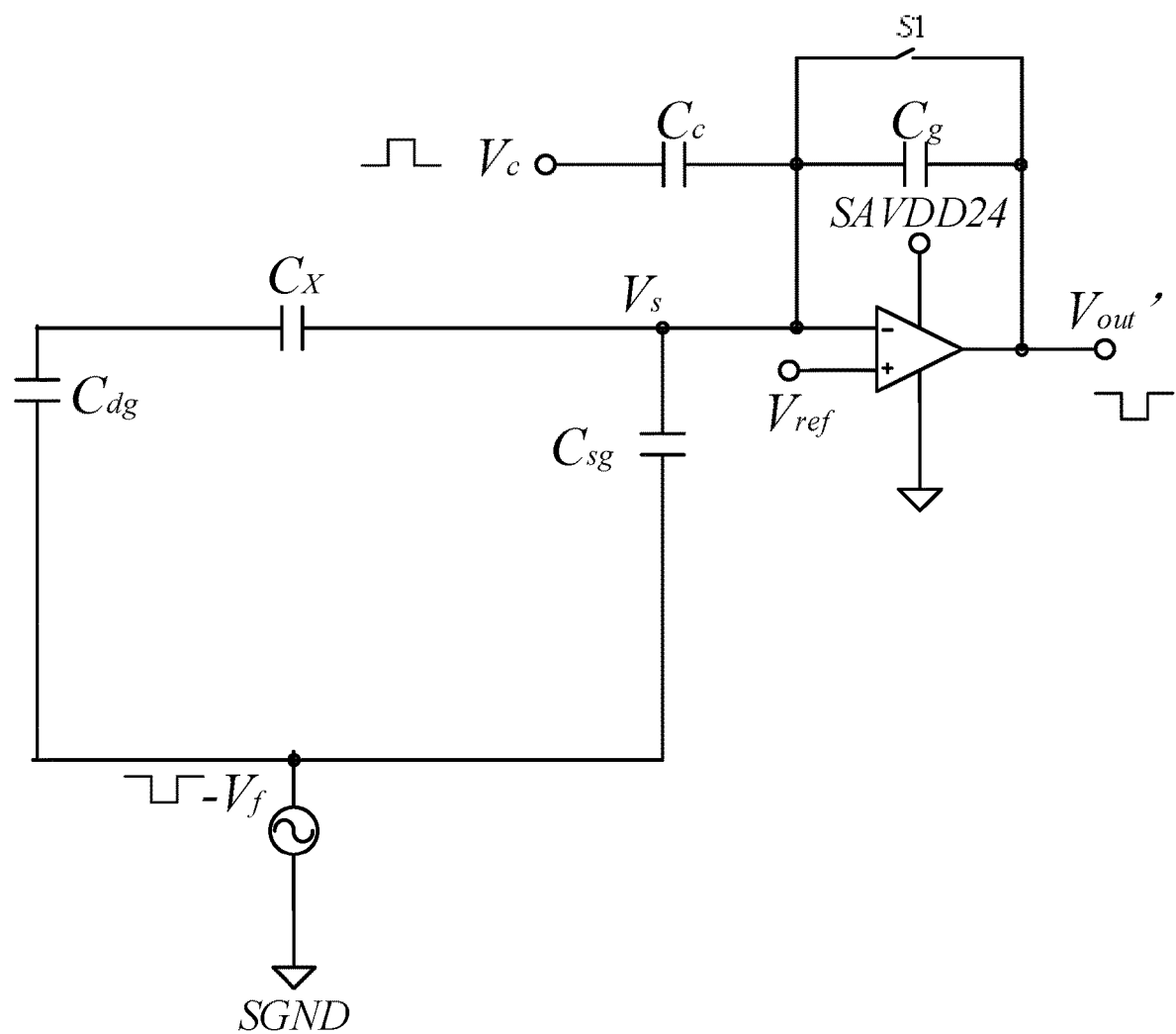
FIG. 6a and FIG. 6b are schematic diagrams of circuits of touch control panels of embodiments of the present application.
Figure 6B:
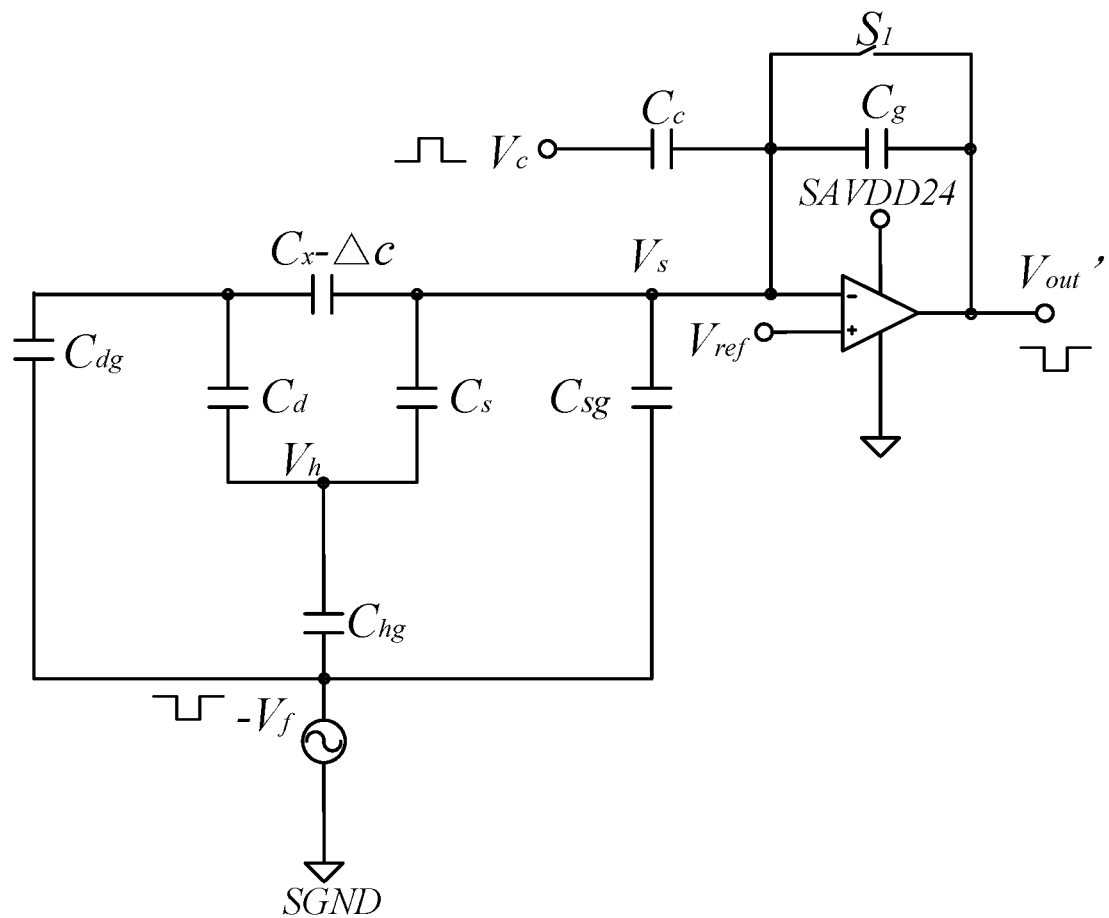

FIG. 6 (including FIG. 6a and FIG. 6b) shows schematic diagram of circuits of touch control panels of embodiments of the present application. FIG. 6a shows a schematic diagram of a circuit when a touch control panel of an embodiment of the present application is not touched, and FIG. 6b shows a schematic diagram of a circuit when a touch control panel of an embodiment of the present application is touched.

For convenience of illustration, an illustration is only given by taking a sensing point (namely, an intersection point of a driving channel and a sensing channel) as an example. As shown in FIG. 6a, when the touch control panel is not touched, there is a capacitance $C_{dg}$ between the driving channel and the floating ground, there is a capacitance $C_{sg}$ between the sensing channel and the floating ground, and there is a mutual capacitance $C_x$ between the driving channel and the sensing channel. $V_f$ is a first driving signal (for example, having a voltage of 3.3V), Vs is a voltage of the sensing channel, $V_{ref}$ is a reference voltage, which may be a fixed value and is connected to a non-inverting end of an operational amplifier so as to obtain $V_{out}$ by comparison, and a value of the $V_{out}$ may correspond to data of a sensing point shown in FIG. 7, which will be described in detail hereinafter. $V_c$ is a voltage of a Cancel (Cancel) circuit, and a cancellation of a voltage output caused by $C_x$ and $C_{sg}$ is implemented through a $C_c$. The Cancel circuit may be the same as the prior art, it does not the core of the present application, and for concision, it will not be repeated redundantly herein.

As shown in FIG. 6b, when the touch control panel is touched, except for the existing capacitance $C_{dg}$, $C_{sg}$ and $C_x$, a capacitance $C_d$ between a driving channel and a human body, a capacitance $C_s$ between a sensing channel and the human body, and a capacitance $C_{hg}$ between the human body and the floating ground may be generated since a finger touches a position on a glass cover that corresponds to a sensing point. $C_d$ and $C_{dg}$ are connected in parallel, and $C_s$ and $C_{sg}$ are connected in parallel, resulting in that a mutual capacitance $C_c$ of the driving channel and the sensing channel decreases $\Delta C$. The decrease of the mutual capacitance results in a change of an output $V_{out}'$. Thus, the $V_{out}'$ may be compared with $V_{out}$ obtained in FIG. 6a so as to locate a touch point.

Figure 7A:
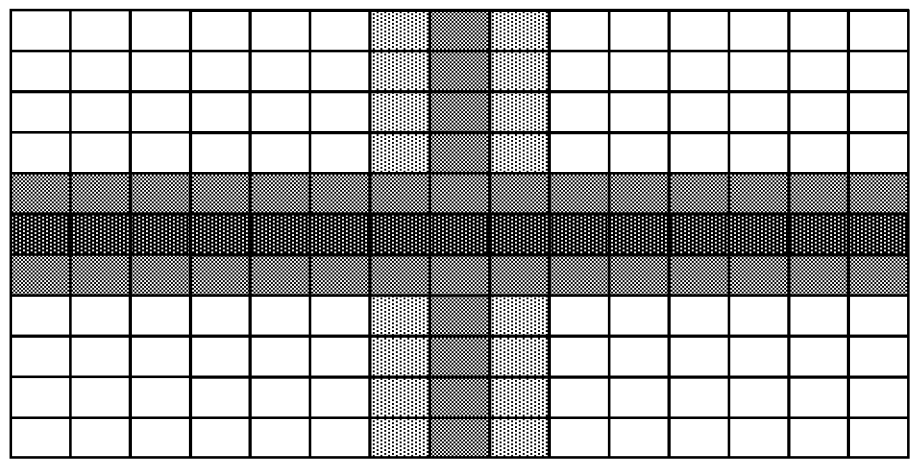
FIG. 7a and FIG. 7b are schematic diagrams of capacitance changes of sensing points in touch control panels of embodiments of the present application.
Figure 7B:
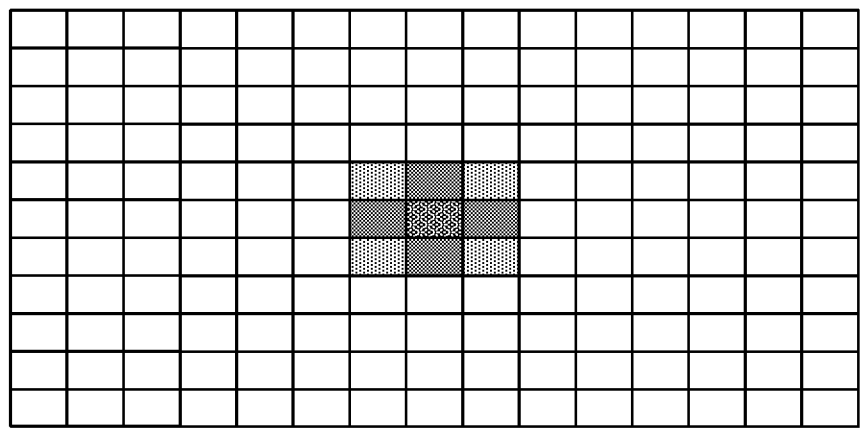

FIG. 7 (including FIG. 7a and FIG. 7b) show schematic diagrams of capacitance changes of sensing points in touch control panels of embodiments of the present application. FIG. 7a shows a schematic diagram of a capacitance change of each sensing point when a touch control panel of an embodiment of the present application detects a touch point. FIG. 7b shows a schematic diagram of a capacitance change of an embodiment of the present application which is obtained after processing a capacitance change of each sensing point.

As shown in FIG. 7a, the touch control panel may detect the touch point through the foregoing method, positions with dark color in the drawing may be understood as positions near the touch point (or a central area), and positions with light color may be understood as positions far away from the touch point (or edge areas). It could be seen that, in the schematic diagram of the unprocessed capacitance change, the number of sensing points with a detected change of coupling capacitance is more, and the schematic diagram of the capacitance change as shown in FIG. 7b is obtained after an algorithm processing. The number of sensing points with a change of coupling capacitance is significantly reduced after the processing, and similar to FIG. 7a, a position with dark color may be understood as a position near the touch point, and positions with light color may be understood as positions far away from the touch point. Thus, coordinate information of the touch point may be accurately determined.

It should be noted that, the algorithm processing mentioned here may be to process with a method in the prior art. Particularly, as examples of FIG. 7a and FIG. 7b, firstly, an average value of each row in a data matrix in FIG. 7a is calculated, and an intermediate data matrix with a row processing is obtained by subtracting the average value of a corresponding raw from data of the data matrix in FIG. 7a; then, average values of columns of the intermediate data matrix obtained from the foregoing step are calculated, a new data matrix with a column processing is obtained by subtracting the average value of a corresponding column from data in the intermediate data matrix of the first step, and the new data matrix is a characteristic data matrix shown in FIG. 7b.

Therefore, according to a touch control panel of the embodiments of the present application, a first driving signal is transmitted to a touch control chip by a driving module such that one end of the touch control chip that is originally configured to connect a cell phone ground accesses the first driving signal, namely, the driving module instead of the cell phone ground becomes a ground reference point of the touch control chip, that is, the touch control chip serves an input end of the first driving signal as a reference ground, thereby implementing floating ground. However, for the touch control chip (or a driving channel), with the input end of the first driving signal as a reference, the cell phone ground that originally has no fluctuating signal has a fluctuating signal, and a person is in a state of being connected to the cell phone ground, therefore, a sensing signal may be generated when the person touches a glass cover, a sensing channel feeds back the detected sensing signal to the touch control chip, and thus the touch control chip determines coordinate information of a touch point. Therefore, a problem of a reduction in touch control sensitivity caused by a floating state is solved through the floating ground.

In the foregoing description, a touch control panel of the embodiments of the present application is described in detail with reference to FIG. 2 to FIG. 7. In the following, a method for detecting a touch point according to an embodiment of the present application will be described in detail with reference to FIG. 8.

FIG. 8 is a schematic flowchart diagram of a method 600 for detecting a touch point according to an embodiment of the present disclosure. The method 600 is applied to a terminal device configured with a touch control panel, and the touch control panel includes: a driving module, a touch control chip, a plurality of driving channels and a plurality of sensing channels, where the driving module is connected to the touch control chip, and the plurality of driving channels and the plurality of sensing channels are connected to the touch control chip, respectively. Modules or units included in the touch control panel are described in the foregoing description. As shown in FIG. 6, the method 600 includes:

S610, the touch control chip receives a first driving signal and a second driving signal transmitted by the driving module, a voltage difference between the first driving signal and the second driving signal is used to drive the plurality of driving channels to operate, and the voltage difference between the first driving signal and the second driving signal is constant;

S620, the plurality of sensing channels collect a sensing signal, where the sensing signal is a coupling signal between the plurality of driving channels and the plurality of sensing channels, and the plurality of driving channels are driven by the voltage difference between the first driving signal and the second driving signal; and S630, the touch control chip determines coordinate information of a touch point on the touch control panel according to the sensing signal.

Optionally, before the touch control chip receives the first driving signal transmitted by the driving module, the method 600 further includes:
 the driving module receives a synchronous input signal, where the synchronous input signal is a rectangular wave synchronized with the touch control chip; and
 the driving module processes the synchronous input signal so as to obtain and output the first driving signal.

Optionally, the touch control chip includes a first power supply end and a first ground end, the driving module includes an operating voltage input end, a synchronous input end, a second power supply end and a second ground end, and the method 600 further includes:
 the driving module receives the synchronous input signal via the synchronous input end, and inputs the first driving signal to the first ground end via the second ground end; and
 the driving module receives the second driving signal via the operating voltage input end, and inputs the second driving signal to the first power supply end via the second power supply end.

Optionally, the terminal device further includes a main control chip, where the main control chip is connected to the driving module,
 and the method 600 further includes:
 the main control chip inputs the second driving signal to an operating voltage input end.

Optionally, the terminal device further includes the main control chip, where the touch control chip is connected to the main control chip via a communication bus,
 and the method 600 further includes:
 the touch control chip transmits the coordinate information to the main control chip via the communication bus.

It should be understood that, respective steps or processes of the method 600 for detecting a touch point according to the embodiment of the present application may correspond to the foregoing and other operations and/or functions of respective modules of a touch control panel 200 according to the embodiments of the present application, and for concision, they will not be repeated redundantly herein.

It should be understood that, in various embodiments of the present application, values of sequence numbers of the foregoing various processes do not mean an order of execution which should be determined based upon functionalities and internal logics thereof, rather than setting any limitation to implementation of the embodiments of the present application.

An embodiment of the present application further provides a terminal device, and a schematic block diagram of the terminal device is shown in FIG. 9. FIG. 9 is a schematic block diagram of a terminal device 900 according to an embodiment of the present application. As shown in FIG. 9, the terminal device 900 includes a main control chip 910 and a touch control panel 920.

The main control chip is connected to a touch control chip of the touch control chip.

It should be understood that, the touch control panel may be the touch control panel described in the foregoing descriptions with reference to FIG. 2 to FIG. 7, a specific method and process of determining coordinate information of a touch point by the terminal device via the touch control panel are described in detail in the foregoing description, and for concision, it will not be repeated redundantly herein.

Therefore, according to the embodiment of the present application, a first driving signal is transmitted to a touch control chip by a driving module such that one end of the touch control chip that is originally configured to connect the cell phone ground accesses the first driving signal, namely, the driving module instead of the cell phone ground becomes a ground reference point of the touch control chip, that is, the touch control chip serves an input end of the first driving signal as a reference ground, thereby implementing floating ground. However, for the touch control chip (or a driving channel), with the input end of the first driving signal as a reference, the cell phone ground that originally has no fluctuating signal has a fluctuating signal, and a person is in a state of being connected to the cell phone ground, therefore, a sensing signal may be generated when the person touches a glass cover, a sensing channel feeds back the detected sensing signal to the touch control chip, and thus the touch control chip determines coordinate information of a touch point. Therefore, a problem of a reduction in touch control sensitivity caused by a floating state is solved through the floating ground.

Those of ordinary skill in the art may be aware that, units and algorithm steps of the examples described in the embodiments disclosed in this paper may be implemented by electronic hardware, computer software, or a combination of the two. Whether these functions are executed in hardware or software mode depends on the specific applications and design constraint conditions of the technical solutions. Those skilled may implement the described functions by using different methods for each specific application, but this implementation should not be considered to be beyond the scope of the present application.

Those skilled in the art to which the present disclosure pertains may clearly understand that, for the convenience and simplicity of description, for the specific working processes of the system, the apparatus and the units described above, may refer to corresponding processes in the foregoing method embodiments, and will not be repeated redundantly herein.

In the several embodiments provided in the present application, it should be understood that, the disclosed system, device and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the embodiments of the present application may be integrated in a processing unit, or the respective units exist separately and physically, or two or more units are integrated in one unit.

If the functions is implemented in the form of the software functional unit and is sold or used as an independent product, it may be stored in a computer readable storage medium. Based on such understanding, the technical solutions of the present application substantially, or the part of the present disclosure making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

Described above are the specific embodiments of the present application only, but the protection scope of the present application is not limited thereto, those skilled who are familiar with the art could readily think of variations or substitutions within the technical scope disclosed by the present application, and these variations or substitutions shall fall within the protection scope of the present application. Therefore, the protection scope of the present application should be determined with reference to the protection scope of the claims.

What is claimed is:

1. A touch control panel, comprising:
   a driving module;
   a touch control chip;
   a plurality of driving channels; and
   a plurality of sensing channels;
   wherein the driving module is connected to the touch control chip, and the plurality of driving channels and the plurality of sensing channels are connected to the touch control chip, respectively;
   wherein the touch control chip is configured to receive a first driving signal and a second driving signal transmitted by the driving module so as to drive the plurality of driving channels to operate by a voltage difference between the first driving signal and the second driving signal, and both of the first driving signal and the second driving signal are fluctuating signals, and the voltage difference between the first driving signal and the second driving signal is substantially constant;
   the plurality of sensing channels is configured to collect a sensing signal which is a coupling signal between the plurality of driving channels and the plurality of sensing channels, and the plurality of driving channels are driven by the voltage difference between the first driving signal and the second driving signal; and
   the touch control chip is configured to determine coordinate information of a touch point on the touch control panel according to the sensing signal.

2. The touch control panel according to claim 1, wherein the driving module is further configured to receive a synchronous input signal, and to process the synchronous input signal so as to obtain and output the first driving signal, wherein the synchronous input signal is a rectangular wave synchronized with the touch control chip.

3. The touch control panel according to claim 2, wherein the touch control chip comprises a synchronous output end configured to input the synchronous input signal to the synchronous input end of the driving module.

4. The touch control panel according to claim 2, wherein the touch control chip comprises a first power supply end and a first ground end, the driving module comprises an operating voltage input end, a synchronous input end, a second power supply end and a second ground end, the synchronous input end is connected to the second ground end, the second ground end is connected to the first ground end, and the first power supply end is connected to the second power supply end, the driving module is configured to receive the synchronous input signal via the synchronous input end, and to receive the second driving signal via the operating voltage input end; and the driving module is configured to input the first driving signal to the first ground end via the second ground end, and to input the second driving signal to the first power supply end via the second power supply end, a capacitor is connected in parallel between the second power supply end and the second ground end, and the capacitor is configured to keep the voltage difference between the second driving signal and the first driving signal substantially constant.

5. The touch control panel according to claim 4, wherein the touch control chip comprises a synchronous output end configured to input the synchronous input signal to the synchronous input end of the driving module.

6. The touch control panel according to claim 4, wherein the driving module comprises: a first inverter, a second inverter, and a first diode, wherein the first inverter is connected to the second inverter in series, an input end of the first inverter is connected to the synchronous input end, an output end of the second inverter is connected to the second ground end, the operating voltage input end is connected to the second power supply end via the first diode so as to input the second driving signal to the second power supply end, and the operating voltage input end is connected to operating voltage ends of the first inverter and the second inverter.

7. The touch control panel according to claim 6, wherein the touch control chip comprises a synchronous output end configured to input the synchronous input signal to the synchronous input end of the driving module.

8. The touch control panel according to claim 4, wherein the driving module comprises: a third inverter, a fourth inverter, a second diode, a boosting circuit and a level converting circuit, wherein the third inverter is connected to the fourth inverter in series, an input end of the third inverter is connected to the synchronous input end via the level converting circuit, an output end of the fourth inverter is connected to the second ground end, the operating voltage input end is connected to the second power supply end via the second diode so as to input the second driving signal to the second power supply end, and the operating voltage input end is connected to operating voltage ends of the third inverter and the fourth inverter via the boosting circuit.

9. The touch control panel according to claim 8, wherein the touch control chip comprises a synchronous output end configured to input the synchronous input signal to the synchronous input end of the driving module.

10. The touch control panel according to claim 9, wherein the touch control panel is disposed in a terminal device, the driving module is connected to a main control chip of the terminal device, and the driving module receives the second driving signal transferred by the main control chip.

11. The touch control panel according to claim 9, wherein the touch control panel is disposed in a terminal device, the touch control chip is connected to a main control chip of the terminal device via a communication bus, and the touch control chip is further configured to transmit the coordinate information to the main control chip via the communication bus.

12. The touch control panel according to claim 1, wherein the touch control chip comprises a synchronous output end configured to input the synchronous input signal to the synchronous input end of the driving module.

13. A terminal device, comprising a main control chip and a touch control panel, wherein the touch control panel comprising:

a driving module;
a touch control chip;
a plurality of driving channels; and
a plurality of sensing channels;

wherein the driving module is connected to the touch control chip, and the plurality of driving channels and the plurality of sensing channels are connected to the touch control chip, respectively, wherein the touch control chip is configured to receive a first driving signal and a second driving signal transmitted by the driving module so as to drive the plurality of driving channels to operate by a voltage difference between the first driving signal and the second driving signal, and both of the first driving signal and the second driving signal are fluctuating signals, and the voltage difference between the first driving signal and the second driving signal is substantially constant;

the plurality of sensing channels is configured to collect a sensing signal which is a coupling signal between the plurality of driving channels and the plurality of sensing channels, and the plurality of driving channels are driven by the voltage difference between the first driving signal and the second driving signal; and the touch control chip is configured to determine coordinate information of a touch point on the touch control panel according to the sensing signal.

14. A method for detecting a touch point, wherein the method is applied to a terminal device configured with a touch control panel comprising a driving module, a touch control chip, a plurality of driving channels and a plurality of sensing channels, wherein the driving module is connected to the touch control chip, and the plurality of driving channels and the plurality of sensing channels are connected to the touch control chip, respectively, and the method comprises:

receiving, by the touch control chip, a first driving signal and a second driving signal transmitted by the driving module, and driving the plurality of driving channels to operate according to a voltage difference between the first driving signal and the second driving signal, and both of the first driving signal and the second driving signal are fluctuating signals, and the voltage difference between the first driving signal and the second driving signal is substantially constant;

collecting, by the plurality of sensing channels, a sensing signal which is a coupling signal between the plurality of driving channels and the plurality of sensing channels, and the plurality of driving channels are driven by the voltage difference between the first driving signal and the second driving signal; and determining, by the touch control chip, coordinate information of a touch point on the touch control panel according to the sensing signal.

15. The method according to claim 14, wherein before the receiving, by the touch control chip, the first driving signal transmitted by the driving module, the method further comprises:

receiving, by the driving module, a synchronous input signal, wherein the synchronous input signal is a rectangular wave synchronized with the touch control chip; and processing, by the driving module, the synchronous input signal so as to obtain and output the first driving signal.

16. The method according to claim 15, wherein the touch control chip comprises a first power supply end and a first ground end, the driving module comprises an operating voltage input end, a synchronous input end, a second power supply end and a second ground end, and the method further comprises:

receiving, by the driving module, the synchronous input signal via the synchronous input end, and inputting the first driving signal to the first ground end via the second ground end; and receiving, by the driving module, the second driving signal via the operating voltage input end, and inputting the second driving signal to the first power supply end via the second power supply end.

17. The method according to claim 16, wherein the terminal device further comprises a main control chip, and the method further comprises:

inputting, by the main control chip, the second driving signal to the operating voltage input end.

18. The method according to claim 17, wherein the terminal device further comprises a main control chip, and the method further comprises:

transmitting, by the touch control chip, the coordinate information to the main control chip via a communication bus.

* * * * *